(12) United States Patent
Bayer et al.

(10) Patent No.: US 11,926,213 B2
(45) Date of Patent: Mar. 12, 2024

(54) VEHICLE DISPLAY WITH FOR-HIRE INTERFACE

(71) Applicant: Gentex Corporation, Zeeland, MI (US)

(72) Inventors: Daniel P. Bayer, Allendale, MI (US); Autumn N. Lagowski, Holland, MI (US); Mark R. Roth, Grand Rapids, MI (US); Bradley R. Hamlin, Allendale, MI (US); Nigel T. Lock, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 483 days.

(21) Appl. No.: 17/142,294

(22) Filed: Jan. 6, 2021

(65) Prior Publication Data

US 2021/0206268 A1 Jul. 8, 2021

Related U.S. Application Data

(60) Provisional application No. 62/957,351, filed on Jan. 6, 2020.

(51) Int. Cl.
| | | |
|---|---|---|
| *B60K 35/00* | (2006.01) | |
| *G06V 40/16* | (2022.01) | |
| *G06V 40/18* | (2022.01) | |

(52) U.S. Cl.
CPC ............ *B60K 35/00* (2013.01); *G06V 40/172* (2022.01); *G06V 40/197* (2022.01); *B60K 2370/166* (2019.05); *B60K 2370/739* (2019.05); *B60K 2370/741* (2019.05); *B60K 2370/779* (2019.05)

(58) Field of Classification Search
CPC ..... B60K 35/00; G06V 40/197; G06V 40/172
USPC ........................................................ 348/118
See application file for complete search history.

(56) References Cited

U.S. PATENT DOCUMENTS

| | | | |
|---|---|---|---|
| 6,572,233 B1 | 6/2003 | Northman et al. | |
| 8,237,909 B2 | 8/2012 | Ostreko et al. | |
| 8,339,526 B2 | 12/2012 | Minikey, Jr. et al. | |
| 8,411,245 B2 | 4/2013 | Lee et al. | |
| 10,126,749 B2 | 11/2018 | Rander | |
| 10,255,816 B2 | 4/2019 | Bartel | |
| 10,607,491 B2 | 3/2020 | Matthiesen et al. | |
| 2018/0365400 A1* | 12/2018 | Lopez-Hinojosa | G06F 21/32 |
| 2019/0072400 A1* | 3/2019 | Chamberlain | G07C 9/37 |
| 2019/0197430 A1 | 6/2019 | Arditi | |

* cited by examiner

*Primary Examiner* — Nguyen T Truong
(74) *Attorney, Agent, or Firm* — Price Heneveld LLP; Brian James Brewer

(57) ABSTRACT

A communication system for a vehicle for a vehicle includes a display device having a screen disposed in a passenger compartment. The display device is in communication with a user interface. The system further includes an authentication system having at least one scanning apparatus configured to capture a biometric data. A communication circuit is configured to communicate with a remote server. A controller is configured to capture the biometric data of a first potential passenger with the at least one scanning apparatus and access a first passenger information comprising a first identification profile from the remote server via the communication circuit. The controller is further configured to authenticate the first potential passenger as at least one of a confirmed passenger and an operator of the vehicle based on the identification profile.

20 Claims, 7 Drawing Sheets

VEHICLE DISPLAY WITH FOR-HIRE INTERFACE

CROSS-REFERENCE TO RELATED APPLICATIONS

This application claims priority under 35 U.S.C. § 119(e) and the benefit of U.S. Provisional Application No. 62/957,351 entitled VEHICLE DISPLAY WITH FOR-HIRE INTERFACE, filed on Jan. 6, 2020, by Autumn N. Lagowski, et al., the entire disclosure of which is incorporated herein by reference.

TECHNOLOGICAL FIELD

The present disclosure relates generally to a display device for a vehicle comprising a user interface and more particularly relates to a vehicle display device comprising a user interface for vehicle transportation information and interaction.

SUMMARY

In one aspect, a communication system for a vehicle for a vehicle is disclosed. The system comprises a display device comprising a screen disposed in a passenger compartment. The display device is in communication with a user interface. The system further comprises an authentication system having at least one scanning apparatus configured to capture a biometric data. A communication circuit is configured to communicate with a remote server. A controller is configured to capture the biometric data of a first potential passenger with the at least one scanning apparatus and access a first passenger information comprising a first identification profile from the remote server via the communication circuit. The controller is further configured to authenticate the first potential passenger as at least one of a confirmed passenger and an operator of the vehicle based on the identification profile and the biometric data.

In another aspect of the disclosure, a method for operating a passenger transit system is disclosed. The method includes receiving a request for transportation from a user and determining an identification of the user associated with the passenger request. Biometric data of a potential passenger is captured with a scanning apparatus and passenger information comprising an identification profile is accessed from the remote server via a communication circuit. The potential passenger is authenticated as at least one of a confirmed passenger and an operator of the vehicle based on the identification profile and the biometric data.

In yet another aspect of the present disclosure, a communication system for a vehicle is disclosed. The system comprises a display device comprising a screen disposed in a passenger compartment. A user interface is in communication with the display device. The system further comprises at least one imager configured to capture image data depicting a rearward-directed field of view relative to a forward direction of the vehicle. A communication circuit configured to communicate with a remote server. The system further comprises a controller configured to access a first passenger information from the remote server via the communication circuit. The controller is further configured to display the first passenger information on the screen and receive an input via the user interface indicating an acceptance of the first potential passenger as a confirmed passenger for transportation. The controller is further configured to communicate the acceptance to the remote server and display the image data on the screen. The controller is further configured to display navigation instructions to a pickup location for the confirmed passenger superimposed over the image data on the screen.

These and other features, advantages, and objects of the present device will be further understood and appreciated by those skilled in the art upon studying the following specification, claims, and appended drawings.

DETAILED DESCRIPTION OF EMBODIMENTS

Figure 1:
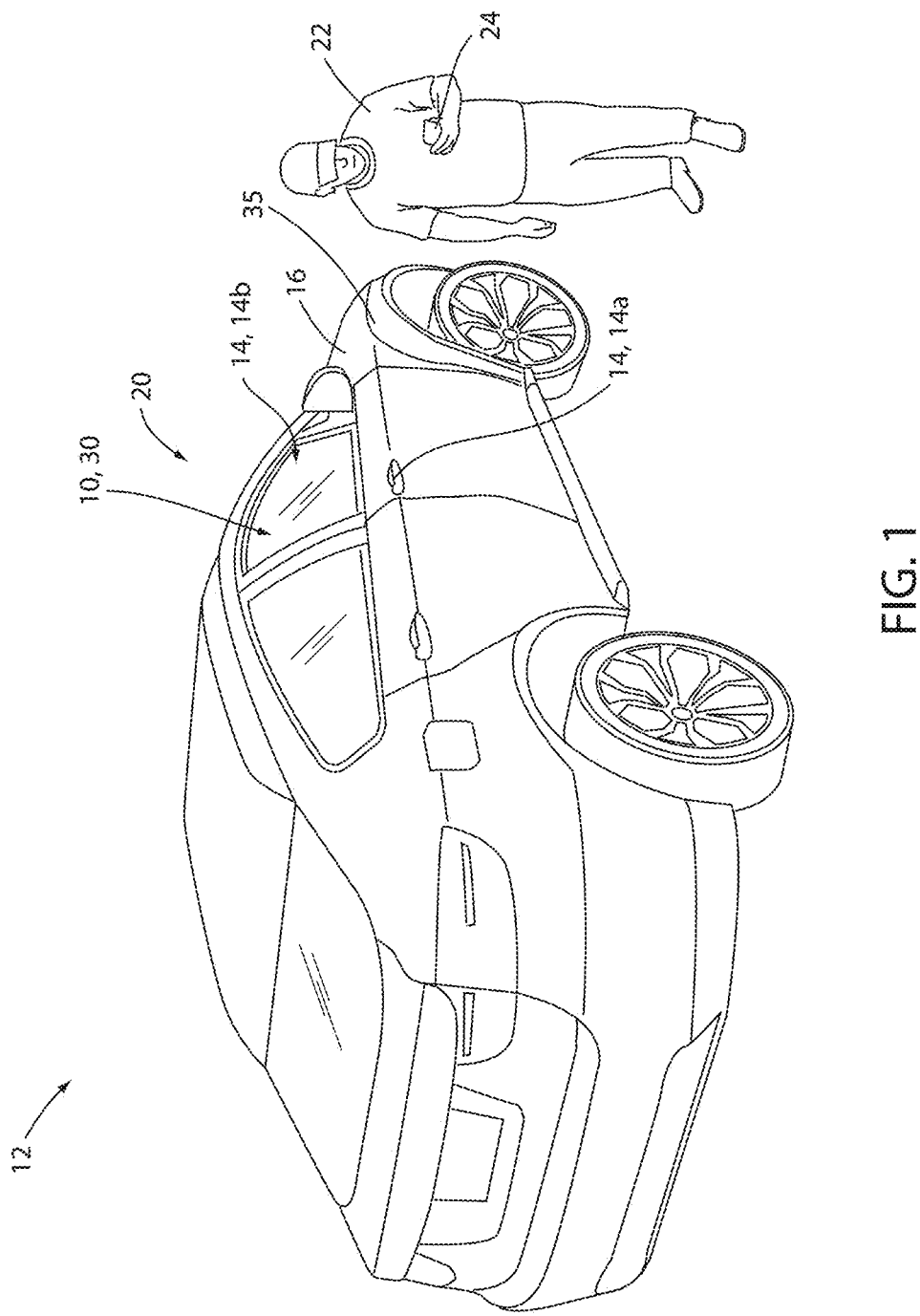
FIG. 1 is a projected view of a vehicle comprising an authentication system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
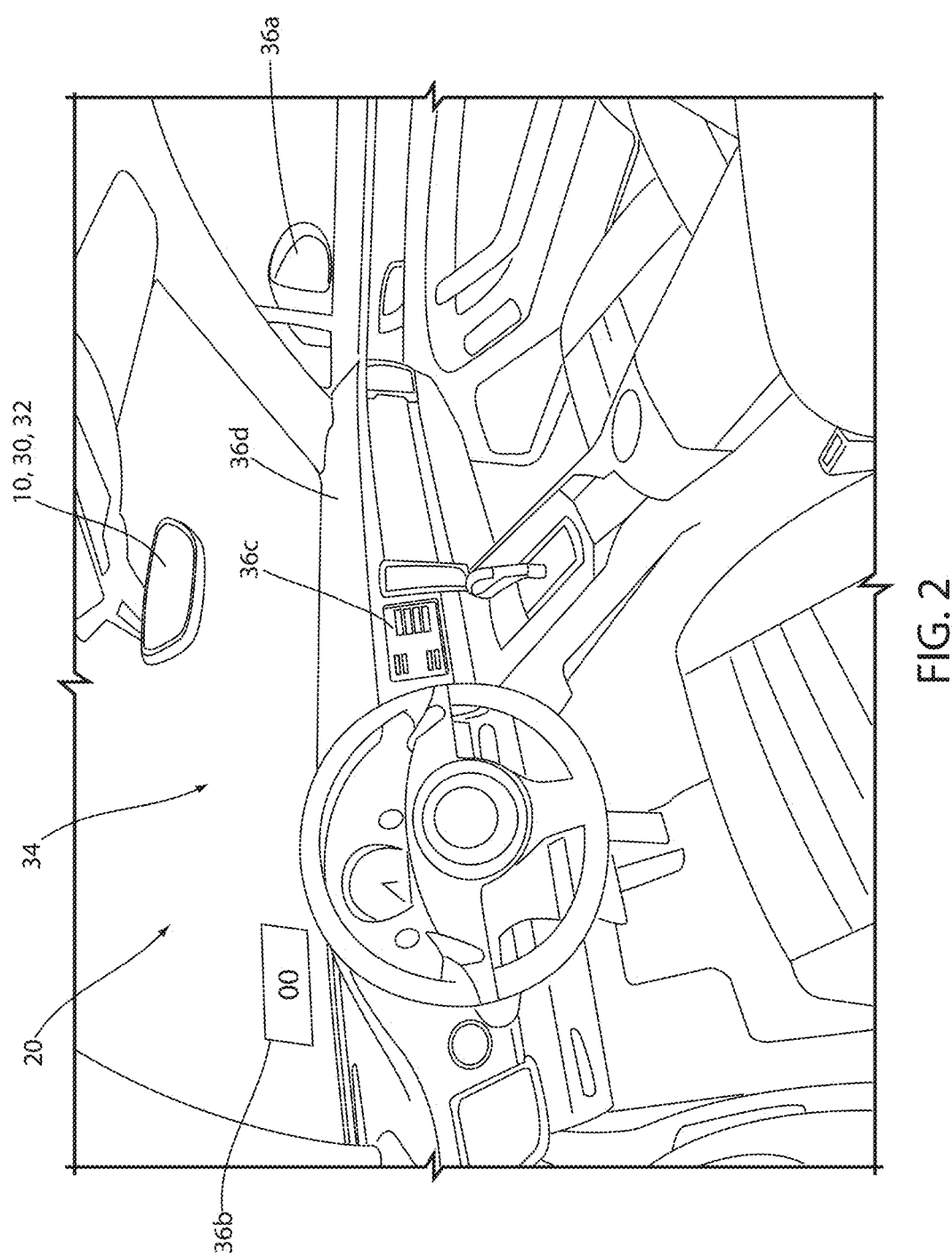
FIG. 2 is a projected view of a vehicle interior demonstrating an authentication system configured to identify an occupant of a vehicle.
Figure 3:
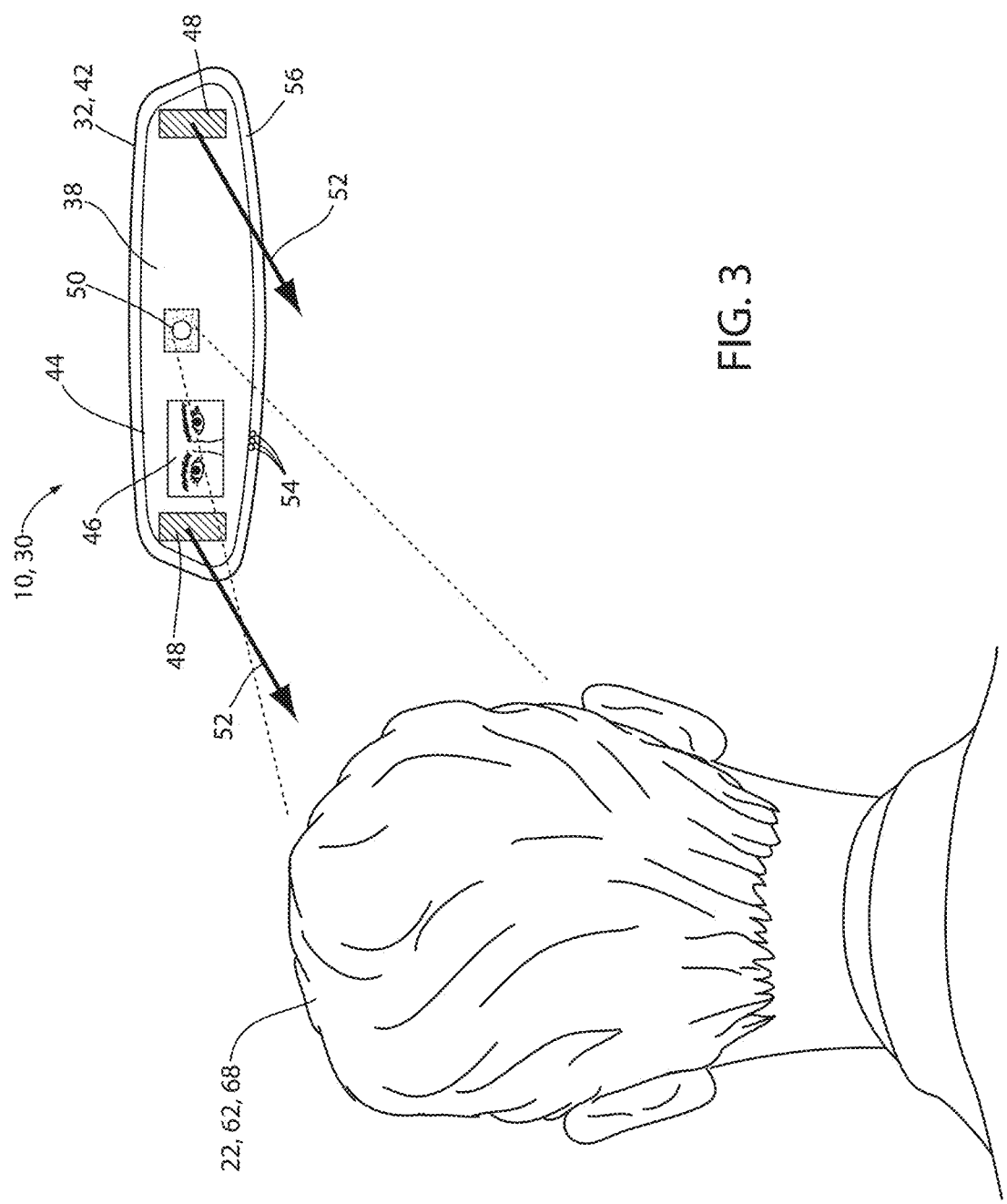
FIG. 3 is a schematic diagram of an scanning apparatus for a vehicle.

Generally referring to FIGS. 1-3, the disclosure provides an information display device 10 for a vehicle 12, which may comprise a user interface. As demonstrated in FIGS. 2 and 3, the display device 10 may correspond to a rearview display device but may similarly be implemented in various portions of the vehicle 12. In an exemplary implementation, the display device 10 may be implemented in a for-hire application for the vehicle 12. In such implementations, the display device 10 may be configured to display a variety of operator, passenger, destination, and rate information which may relate to the for-hire operation of the vehicle 12. Additionally, the display device may be implemented as a user interface in relation to a for-hire or rideshare operation of the vehicle 12. Accordingly, the display device may be flexibly implemented to suit a variety of applications by supplying transportation and occupant information as well as receiving inputs or instructions from an operator or passengers of the vehicle 12.

In some implementations, the display device 10 may also be implemented to display navigation directions (e.g. from a navigation system) as well as communicate operator, passenger, rate, and destination information related to for-hire operation of the vehicle. In such implementations, the display device 10 may display information for a component of an integrated for-hire communication system 20. For example, as later discussed herein, the display device 10 may be in communication with a mobile device 24 of an occupant 22 or passenger of the vehicle 12 and one or more external servers that may be configured to communicate travel requests to the display device 10 to accommodate and monitor the for-hire operations of the vehicle 12. In this way, the system 20 may provide for a convenient interface to support various operations of the vehicle 12, particularly for passenger pickup and delivery tasks.

Still referring to FIGS. 1-3, in operation the system 20 may be configured to communicate and monitor the pickup and drop-off locations of one or more occupants (e.g. occupant 22) of the vehicle 12. Such a procedure may be achieved in a variety of ways. For example, as shown in FIG. 1, a projected view of the vehicle 12 is shown depicting the occupant 22 approaching the vehicle 12 with the mobile device 24. Accordingly, the system 20 may be configured to receive a pickup request from the occupant 22. The request from the occupant 22 may include a pickup location identified by a global positioning system (GPS), which may be incorporated in a mobile device 24 of the occupant 22. In operation, the pickup request may be displayed on the display device 10 to the operator of the vehicle 12. Additionally, the display device 10 may be configured to receive inputs from the operator indicating an acceptance of a pickup request.

In order to facilitate the pickup request, the request may be communicated from an application of the mobile device 24 via a remote server configured to communicate with the for-hire communication system 20 and display the pickup and/or passenger information on the display device 10. For example, the remote server may correspond to a server operated by a for-hire or rideshare company or affiliate (e.g. Uber®, Lift®, etc.). In this configuration, the communication system 20 may be configured to communicate passenger information including fare information, pickup information, destination information, navigation information and additional information that may be related to the for-hire operation of the vehicle 12. Additional information regarding the communication system 20 in relation to the mobile device 24 and the remote server are discussed in reference to FIG. 5.

In some implementations, the display device 10 may be implemented as a component and/or incorporated in an authentication system 30 of the vehicle 12. The authentication system 30 may be configured to capture identifying information for an operator or occupant of the vehicle 12 in order to authorize specific vehicle functions or operations. For example in some embodiments, the disclosure may provide for a scanning apparatus 32 configured to detect one or more identifying characteristics of the operator or an occupant (e.g. a potential occupant) attempting to enter the vehicle 12. In this way, the for-hire communication system 20 may provide for secure operation of the vehicle 12 by accurately identifying the identity of the operator and/or the occupant 22.

Referring now to FIGS. 2 and 3, the scanning apparatus 32 may be incorporated as a portion of the display device 10. Additionally or alternatively, the scanning apparatus 32 may be disposed on an exterior portion of the vehicle 12 and/or disposed within various portions of interior cabin 34 of the vehicle 12. Accordingly, the scanning apparatus 32 may be flexibly configured to provide fora collection or capture of scanning data or biometric data to support an identity authentication for the authentication system 30. The authentication system 30 may be in communication with or be integrated with the for-hire communication system 20, which may be configured to control or communicate with a vehicle control system 35 or vehicle controller including a variety of systems and subsystems of the vehicle 12 (e.g. an engine control unit, a navigation system, a vehicle guidance system, a cabin control module, etc.).

The scanning apparatus 32 may correspond to a biometric scanner configured to capture biometric data or scanning data of an occupant 22 or a potential occupant of the vehicle 12. For example, the scanning apparatus 32 may correspond to an iris imager or scanner, fingerprint scanner, face imager or scanner, voice scanner/recorder, or various other scanning devices. In some embodiments, scanning apparatus 32 may include or incorporate a plurality of the aforementioned types of apparatuses. The scanning data captured by and/or associated with the scanning apparatus 32 may be saved in a local memory or remote cloud server that may be accessible via a wireless communication interface. In this way, the authentication system 30 may access the local memory or a remote server to search and match scanning data or biometric data to an identification profile to identify the operator or occupant 22. Though discussed separately as operators and passengers, the disclosure may generally be applicable to occupants or potential occupants of the vehicle 12.

As discussed herein, the terms identification and authentication may generally refer to an analysis completed by the authentication system 30 configured to identify the operator and/or occupant 22 of the vehicle 12. The disclosure provides for various embodiments configured to provide at least one authentication routine configured to securely indicate an identity of the occupant 22. Accordingly, the authentication may provide for an identification of an authenticated occupant and grant access and/or privileges to modify or control various features of the vehicle 12. In some embodiments, the system 30 may similarly be configured to access an identification profile configured to provide for the authentication of the occupant 22.

Based on the identification profile, the authentication system 30 may access and/or update a variety of preferences and/or operational parameters of the vehicle 12. For example, the authentication system 30 may be configured to authenticate the operator or occupant 22 and communicate the authentication to the for-hire communication system 20. In response to the authentication of the operator or occupant 22, the for-hire communication system 20 may be configured to access travel information, profile information, reviews, and various information related to the operator or occupant 22. Accordingly, the for-hire communication system 20 may be configured to receive or access operator or occupant parameters based on a profile identified in relation to the authentication via the authentication system 30. The occupant parameters may include, but are not limited to, one or more of the following settings or preferences: a seat position, preset configurations (e.g. stations, light/display settings), themes, colors, control preferences, and/or any other configurable attributes of the vehicle 12. The occupant parameters may also include financial information associated with occupant 22 of the vehicle 12, including, e.g., information identifying a payment account, a passenger profile related to a for-hire service, etc. Though referred to in relation to a for-hire operation, the systems and device described herein may be implemented in autonomous vehicles and/or ride-share vehicles.

Still referring to FIGS. 2 and 3, the scanning apparatus 32 may be disposed in the display device 10. Additionally, the second scanning apparatus 32 may be incorporated as a component in one or more of an exterior rearview mirror 36a, a heads-up display 36b, an interior console 36c, a dash 36d, or various portions of the passenger cabin 34 or exterior of the vehicle 12. In this way, the authentication system 30 may provide various levels of security and operating privileges to ensure that the operator and/or the occupant 22 are authorized to access and utilize various features of the vehicle 12 and the for-hire communication system 20. Accordingly, the disclosure may provide for a variety of solutions that may be applied to improve operations of the vehicle 12, particularly in relation to for-hire operations.

In various embodiments, the authentication system 30 may be configured to utilize one or more communication circuits 138 (See FIG. 5) to transmit or receive data from one or more remote servers or other devices. For example, in some embodiments, a controller of the communication system 20 may be operable to send authentication data, biometric or scanning data, and various other forms of data to a remote server that may be configured to process the data to authenticate or identify an identification profile as discussed herein. Additionally, the controller may be operable to receive an authentication of the operator or occupant 22, an identification profile, operating parameters or operational privileges for the vehicle 12, a software update or various information related to one or more systems from the remote server.

The biometric and/or scanning data may correspond to various forms of data, which may be configured to capture one or more unique or identifying characteristics of the operator and/or occupant 22. The biometric data may correspond to image data, audio data, or various forms of sensory data. Such data may be utilized by the authentication system 30 and/or the remote server to process an iris recognition, fingerprint recognition, voice recognition, face recognition, gesture recognition or various forms of biometric processing that may be captured by the scanning apparatus(es) 32. Accordingly, the authentication system 30 may be configured to authenticate an identity of the operator or occupant 22 in a variety of ways to suit a desired application.

In implementations that utilize the one or more communication circuits 138 to communicate with the mobile device 24 and/or the remote server, the communication system 20 may be in communication with a communication network operable to connect to a server, the internet, and/or a portal configured to securely communicate information. Further details describing the authentication system 30, the mobile device 24, and the remote server are discussed in reference to FIG. 5.

Referring now to FIG. 3, an exemplary embodiment of the scanning apparatus 32 is shown. As discussed herein, the scanning apparatus 32 may be operable to perform an identification or authentication function. In an exemplary embodiment, the scanning apparatus 32 is shown incorporated in an interior rearview assembly 42. The rearview assembly 42 may correspond to an electro-optic assembly 44 having an electrochromic (EC) mirror element. The identification function may correspond to an eye-scan-identification function. In this configuration, the scanning apparatus 32 may provide for an rearview assembly 42 configured to authenticate an identity of the operator or occupant 22 based on an eye-scan identification function.

A scanning operation of the scanning apparatus may be initiated by activating an icon representing an "eye," which may be displayed on a display screen 46. The display of the icon may alert the operator or occupant 22 to initiate identification by positioning his or her face in a particular position. The eye-scan-identification function may utilize an infrared illumination emitted toward an eye of the operator or occupant 22 from one or more emitters 48 to illuminate the eye for the identification. Such illumination may be optimized in conditions allowing for a high optical transmittance in the near infrared (NIR) range. In some embodiments, the disclosure may provide for an electrochromic (EC) stack of the electro-optic assembly that may have a high light transmittance in the NIR range, for example wavelengths of light ranging from 800 nm to 940 nm. Additionally, in some implementations, the electro-optic assembly may comprise a plurality of light sources configured to illuminate at least one iris of the operator or occupant 22 of the vehicle 12.

To provide for the eye-scan-identification function of the authentication system 30, an image sensor 50 may be disposed proximate a rear surface of the electro-optic assembly 44. The image sensor 50 may correspond to, for example, a digital charge-coupled device (CCD) or complementary metal-oxide-semiconductor (CMOS) active pixel sensor, although may not be limited to these exemplary devices. The image sensor 50 may be in communication with the at least one emitter 48. The emitter 48 may correspond to a plurality of infrared emitter banks configured to output an emission 52 in the NIR range. Each of the infrared emitter banks may comprise a plurality of light emitting diodes, which may be grouped in a matrix or otherwise grouped and disposed behind a rear surface of the electro-optic device. In this configuration, the scanning apparatus 32 may be configured to illuminate the eyes of the operator or occupant 22, such that the image sensor 50 may capture image data including details of the irises of the eyes.

The display 38 may be disposed in the rearview assembly 42 and may be operable to display the image data received from the image sensor 50, such that the occupant may view the image data. In this configuration, the operator or occupant 22 may adjust a position of the eyes shown on the display 38 to position the eyes, such that the scanning data or biometric data may include the necessary features required to identify the occupant. In an exemplary embodiment, the features required to identify the operator or occupant 22 of the vehicle 12 may correspond to features of one or more of the eyes of the operator or occupant 22 (e.g. the irises).

The display 38 may correspond to a partial or full display mirror configured to display an image data through at least a portion of the rearview assembly 42. The display 38 may be constructed utilizing various technologies, for example LCD, LED, OLED, plasma, DLP or other display technology. Additionally, the display may comprise a touchscreen interface, which may correspond to a capacitive, resistive, or other forms of user interface technologies. Examples of display assemblies that may be utilized with the disclosure may include U.S. Pat. No. 6,572,233 "Rearview Mirror With Display," U.S. Pat. No. 8,237,909 entitled "Vehicular Rearview Mirror Assembly Including Integrated Backlighting for a Liquid Crystal Display (LCD)," U.S. Pat. No. 8,411,245 "Multi-Display Mirror System and Method for Expanded View Around a Vehicle," and U.S. Pat. No. 8,339,526 "Vehicle Rearview Mirror Assembly Including a High Intensity Display," which are incorporated herein by reference in their entirety.

The scanning apparatus 32 may further comprise an indicator 54 in the rearview assembly 42. The indicator 54 may be in communication with the controller and configured to output a signal to identify a state of the scanning apparatus 32 and/or a rearview camera. The indicator 54 may correspond to a light source that may be operable to flash and/or change colors to communicate a state of the scanning apparatus 32. The indicator 54 may correspond to a light emitting diode (LED), and in an exemplary embodiment, the indicator 54 may correspond to a red, green, and blue (RGB) LED operable to identify the state of the scanning apparatus 32 by outputting one or more colored emissions of light.

The various components of the electro-optic assembly 44 and the scanning apparatus 32 may be contained within a housing 56 of the rearview assembly 42. In this way, the various components discussed herein may be substantially hidden from a view of the occupant 22. Accordingly, the disclosure may provide for various advanced functions from the electro-optic assembly 44 and the scanning apparatus 32 while maintaining an appearance of a conventional rearview mirror.

Referring now to FIGS. 4A-4F, an exemplary operation of the display device 10 and the communication system 20 is discussed in reference to a for-hire operation scenario of the vehicle 12. As shown in each of FIGS. 4A-4F, exemplary display renderings 60 are shown demonstrating states of the display device 10 in reference to various aspect of the operation of the vehicle 12 in the for-hire operation scenario. As previously discussed, an operator 62 (e.g. Driver A) may be identified based on scanning data captured by the scanning apparatus 32 of the authentication system 30. In response to the identification of the operator 62, the authentication system 30 may operate in combination with the display device 10 and the for-hire communication system 20 to display operator information 64 related to a preference of the operator 62 and/or related to the operation of the vehicle 12. For example, in response to the identification or authentication of the identity of the operator 62, the display device 10 may be configured to display a picture of identity verification of the operator 62, traffic information, weather information, fare/rate information for fares, demand for travel requests, and/or a variety of forms of information that may be related to the operation of the vehicle 12.

Figure 4A:
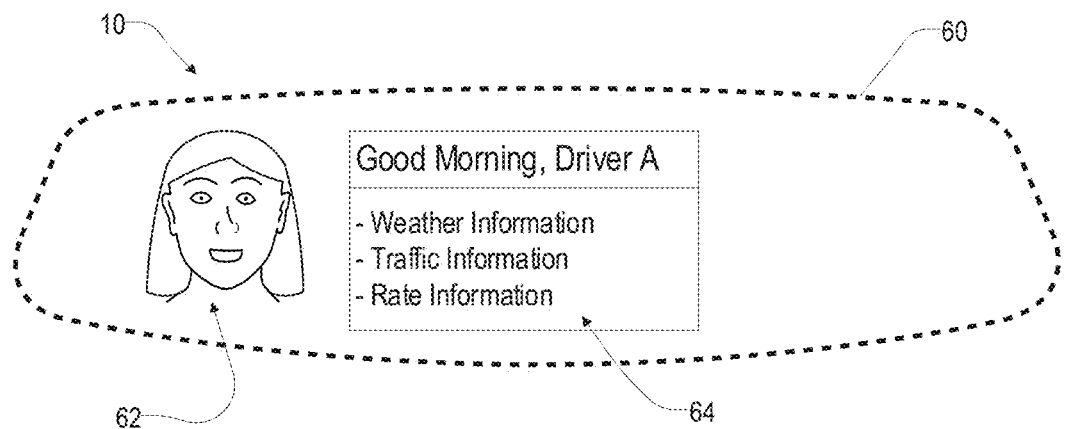
FIG. 4A is a representation of an information display comprising a user interface implemented in a for-hire application.
Figure 4B:
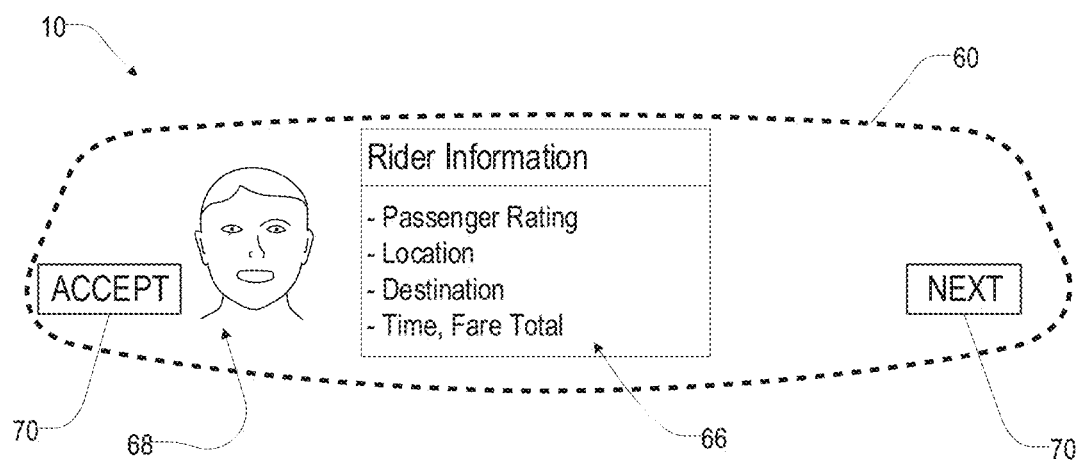
FIG. 4B is a representation of an information display comprising a user interface implemented in a for-hire application.

Referring now to FIG. 4B, the for-hire operating scenario may be initiated via an application operating on the mobile device 24 of the occupant 22 as previously shown in FIG. 1. For example, a request for a pickup may be communicated from the application of the mobile device 24 via a remote server configured to communicate with the for-hire communication system 20. In response to receiving the pickup request, the display device 10 may display the pickup and/or passenger information 66 for a potential occupant 68 on the display device 10. As previously discussed, the remote server may correspond to a server operated by a for-hire or rideshare company or affiliate (e.g. Uber®, Lift®, etc.).

The passenger information 66 may include various information describing the potential occupant 68 including a profile picture, name, passenger rating, and various information that may be utilized by the operator 62 to aid in the selection and identification of the potential occupant 68 upon pickup. The passenger information may also include a pickup location (e.g. address, city/neighborhood), distance, time to a pickup location, fare information, and additional information related to the potential occupant 68. Based on this information, the operator 62 may interact with the user interface (e.g. touchscreen interface) of the display device 10 to either accept the potential occupant 68 or view another potential occupant via one or more soft keys 70 or inputs implemented on the display device 10. In this way, the operator 62 may utilize the display device 10 to view and accept the request for the potential occupant 68 from the remote server.

In response to an acceptance of the request for transportation from the potential occupant 68, the controller of the for-hire communication system 20 may communicate a confirmation of the potential occupant 68 as a confirmed passenger 78. As previously discussed, the communications with the remote server may be enabled via one or more communication circuit(s) 138. In response to the indication of the confirmed passenger 78, the controller of the for-hire communication system 20 may be configured to change states to demonstrate pickup information 80 for the confirmed passenger 78, navigation instructions 82, as well as video or image data depicting a scene proximate the vehicle 12 as capture by one or more imagers or rearward-directed cameras as shown in FIG. 4C.

Figure 4C:
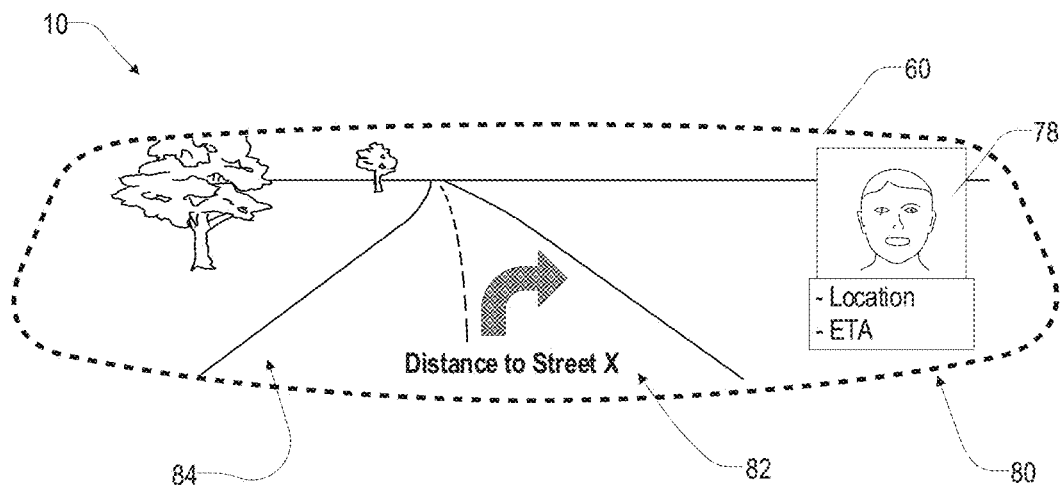
FIG. 4C is a representation of an information display comprising a user interface implemented in a for-hire application.

Referring now to FIG. 4C, the display device 10 is shown in a mode of operation that may be applied in response to the operator 62 traveling or driving to the pickup location for the confirmed passenger 78. As shown in the display rendering 60, the controller of the display device 10 may be configured to display image data 84, which may correspond to image data depicting a rearward-directed scene relative to a forward operating direction of the vehicle 12. Superimposed or overlaid over the image data, the controller of the display device 10 may also display the pickup information 80 (e.g., rate information, location, arrival time, distance etc.) for the confirmed passenger 78, navigation instructions 82, and various additional information. This pickup information 80 and/or navigation instructions 82 (e.g. an address, GPS location, turn-by-turn instructions, etc.) may be communicated from the remote server in response to the selection of the pickup for the confirmed passenger 78 as previously discussed in reference to FIG. 4B.

As discussed in reference to the steps and configurations shown in FIGS. 4A-4F, the for-hire communication system 20 may communicate with the remote server and/or the mobile device 24 through the operation of the system 20. In this way, the for-hire communication system 20 may receive updates, information, traffic alerts, destination or pickup alerts and change requests, driving instructions, etc. Such communication may be processed via the one or more communication circuit(s) 138. In this way, the for-hire communication system 20 may be implemented to maintain communication including a GPS location of the vehicle 12, a status of the vehicle 12, identification or authentication information for each of the operator 62 and the confirmed passenger 78 and various additional information that may be implemented to assist in the operation of the vehicle 12.

Figure 4D:
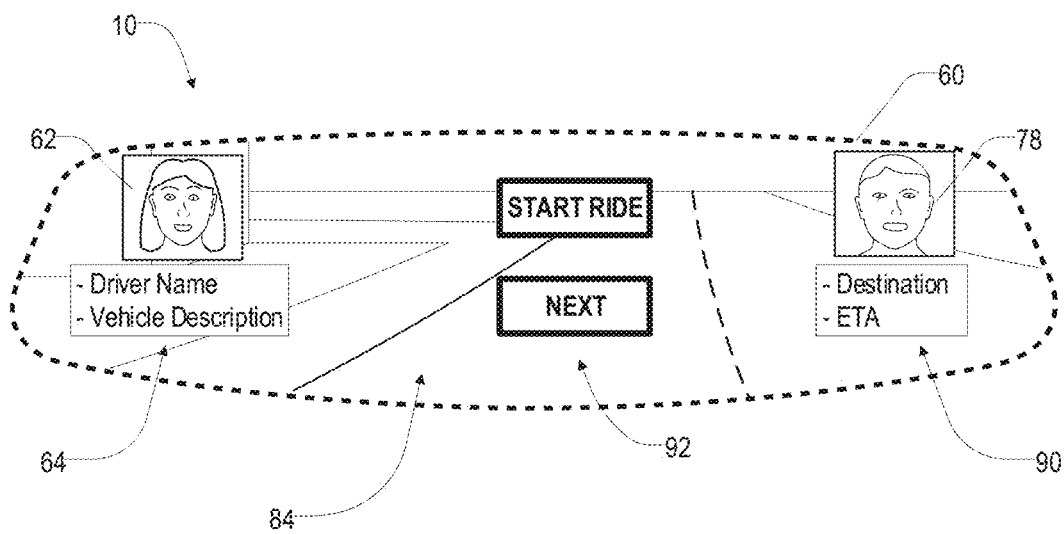
FIG. 4D is a representation of an information display comprising a user interface implemented in a for-hire application.

Referring now to FIG. 4D, upon reaching the pickup location, the controller of the display device 10 may be configured to change the information shown in the display rendering 60 to depict transport information 90 for the confirmed passenger 78. Such a change in the status of the display device 10 may be prompted in response to the controller of the for-hire communication system 20 detecting the vehicle proximate to the pickup location based on the GPS location of the vehicle 12. The transport information 90 may include various information including, but not limited, to destination information, time and distance to the destination, fare information, information identifying the operator 62 and/or the confirmed passenger 78, etc. Additionally, the user interface of the display device 10 may be controlled to display a confirmation request 92 of a trip requested for the confirmed passenger 78. In response to an input confirming the confirmation request 92, the for-hire communication system 20 may communicate the confirmation to the remote server, which may correspond to a server operated by a for-hire or rideshare company or affiliate (e.g. Uber®, Lift®, etc.).

Figure 4E:
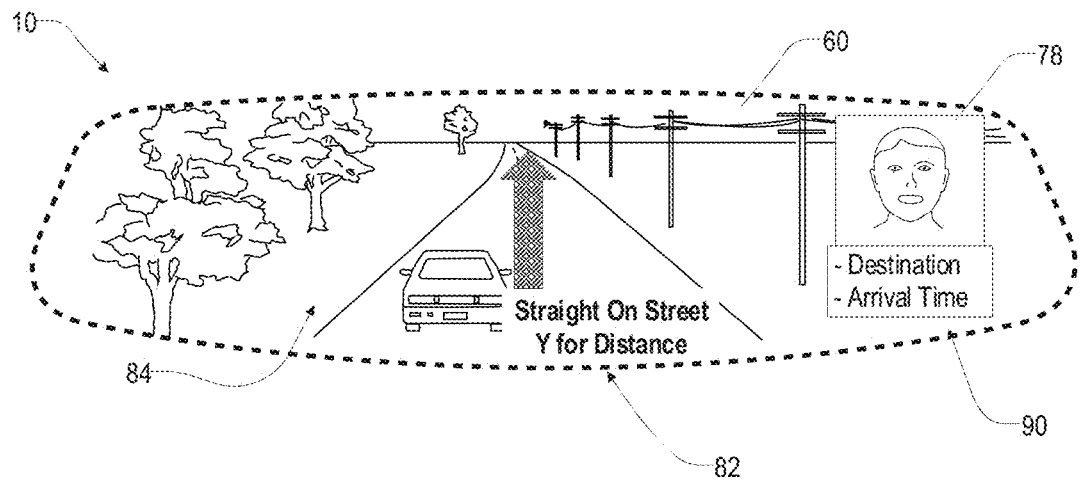
FIG. 4E is a representation of an information display comprising a user interface implemented in a for-hire application.

Referring now to FIG. 4E, upon receiving an affirmative response to the confirmation request via the display device 10, the controller of the for-hire communication system 20 may return the display device 10 to an operating mode similar to that discussed in reference to FIG. 4C. For example, the display device 10 may be configured to display the image data 84, which may correspond to image data depicting a rearward-directed scene relative to a forward operating direction of the vehicle 12. Superimposed or overlaid over the image data, the controller of the display device 10 may also display the transport information 90 (e.g., rate information, location, arrival time, distance etc.) for the confirmed passenger 78, navigation instructions 82, and various additional information. This transport information 90 and/or navigation instructions 82 (e.g. an address, GPS location, turn-by-turn instructions, etc.) may be communicated from the remote server or displayed based on a navigation or guidance system integrated with or otherwise in communication with the for-hire communication system 20.

Figure 4F:
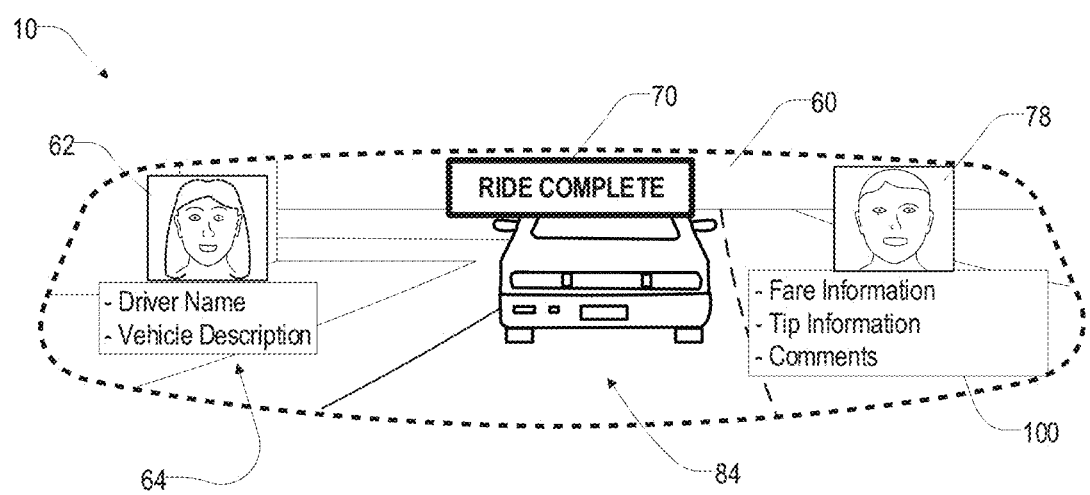
FIG. 4F is a representation of an information display comprising a user interface implemented in a for-hire application.

Referring to FIG. 4F, in response to reaching the destination, the for-hire communication system 20 may be configured to demonstrate summary information 100 for the operator 62, the confirmed passenger 78, and various information related to the transport. For example, summary information 100 may include, but is not limited to, fare or tip information, passenger or operator comments, etc. Additionally, the user interface may demonstrate of the display device 10 may demonstrate an option or input to indicate that the ride is complete via the soft keys 70. Again, the information shown on the display device 10 may be controlled in response to inputs from the operator 62, a location of the vehicle 12 as detected by the GPS, communications from the remote server, and/or communications from the mobile device 24. Accordingly, the for-hire communication system 20 may be implemented in combination with the display device 10 to provide various useful features in relation to the operation of the vehicle 12, particularly in a for-hire operating state.

Figure 5:
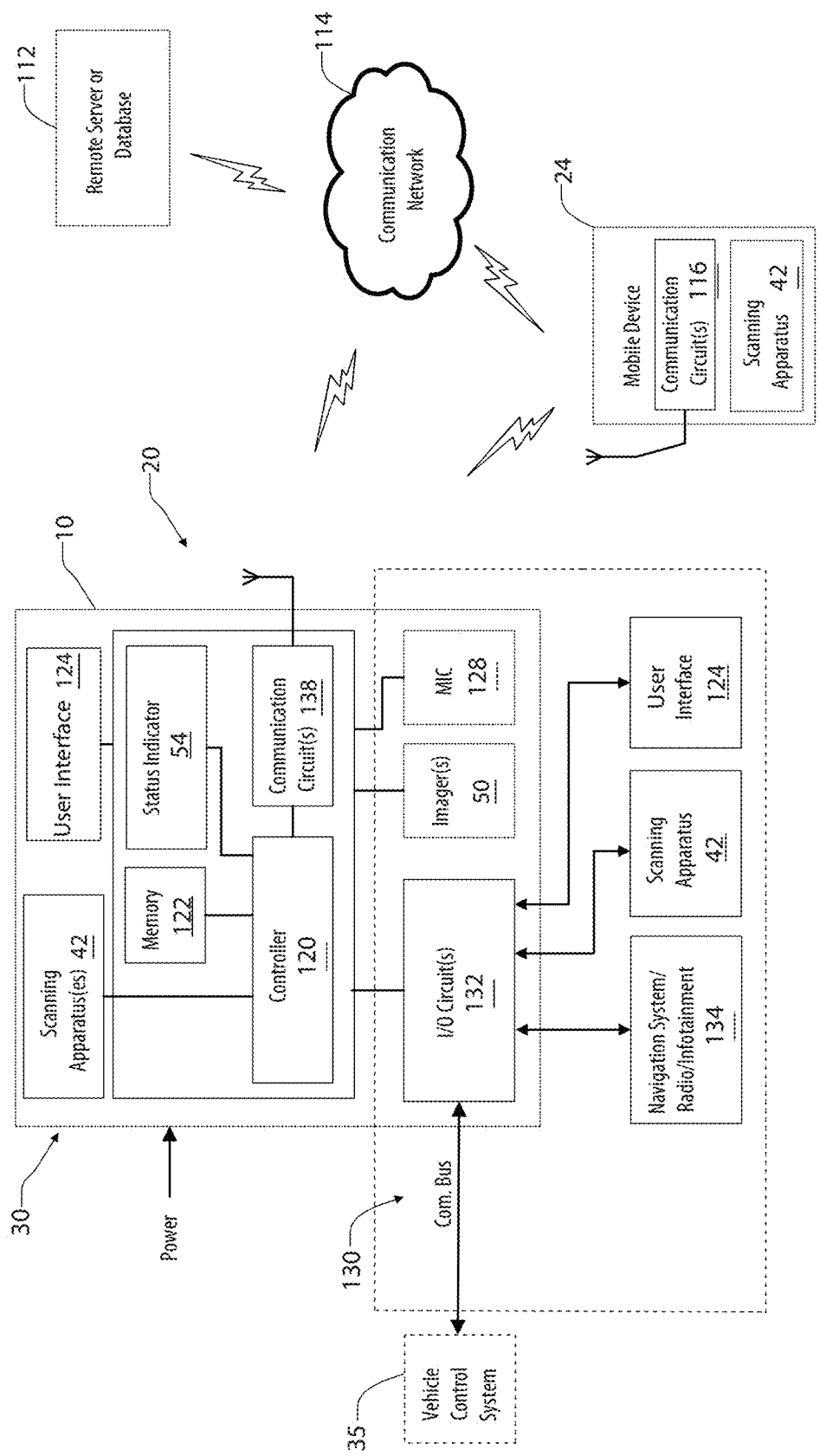
FIG. 5 is a block diagram of an authentication system demonstrated in communication with a remote server or database in accordance with the disclosure.

Referring now to FIG. 5, a block diagram of the communication system 20 is shown in communication with a remote server or database in accordance with the disclosure. The communication system 20 may incorporate or be in communication with various input devices, transducers, and/or sensors. Additionally, the communication system 20 may be integrated with and/or in communication with the authentication system 30 and the corresponding scanning apparatus(es) 32. The scanning apparatus(es) 32 may be configured to capture data and/or receive inputs from various vehicle systems and/or be configured to capture and communicate data with the authentication system 30. The authentication system 30 may then authenticate and determine an identity of the occupant 22 or potential occupant of the vehicle 12 to control or access preference settings, operating parameters, and/or administrative or operational privileges for the vehicle 12.

In an exemplary embodiment, the communication system 20 may comprise the one or more communication circuits 138 that may be configured to communicate with the mobile device 24, a remote server 112 (e.g. a for-hire administration server), and/or any device connected via a compatible communication network 114 or interface. For example, the remote server 112 may correspond to a server operated by a for-hire or rideshare company or affiliate (e.g. Uber®, Lift®, etc.). The communication network 114 may correspond to various forms of wireless communication, for example Bluetooth®, Bluetooth® Low-energy (BT-LE), Near Field Communication (NFC), and/or the like. Examples of standards related to NFC include ISO 18000-3, ISO 13157, and the like, and examples of standards related to BT-LE include IEEE 802.15.1 and the like. Additionally, the communication network 114 may be configured to operate using one or more of a plurality of radio access technologies including one or more of the following: Long Term Evolution (LTE), wireless local area network (WLAN) technology, such as 802.11 Wi-Fi and the like, and other radio technologies as well.

In some implementations, the mobile device 24 may comprise a scanning apparatus 32 that may be implemented to complete an authentication process for the occupant 22. In such implementations, the mobile device 24 may be operable to connect to a server, the internet, and/or a portal configured to receive an authentication. For example, the mobile device 24 may comprise one or more communication circuits 116 similar to those discussed herein to communicate with the remote server 112 to process or perform one or more of the authentication task or routines based on an identification profile. Additionally, the mobile device 24 may be configured to operate an application configured to request the transportation from a for-hire vehicle service via the for-hire communication system 20 and the remote server 112. In this way, the mobile device 24 may serve as a user interface to interact with the for-hire communication system 20 directly or via the remote server 112.

In some embodiments, the authentication system 30 may be configured to compare and/or process the data received from the scanning apparatuses 14 to authenticate or identify a security confidence corresponding to a percent likelihood that an identity of a party to a transaction is authentic. Based on the confidence determination, the authentication system 30 may require an additional authentication which may be completed utilizing a different scanning apparatus 32 or scanning technology. For example, if a voice recognition authentication returned a low authentication confidence, the authentication system 30 may request a secondary authentication with an iris scanning device (e.g. the scanning apparatus 32 of the rearview assembly 42). In this way, the authentication system 30 may ensure a minimum confidence for the authentication.

The display device 10 and/or the communication system 20 may comprise a controller 120 configured to control various components and/or integrated circuits of the system 20. The controller 120 may include various types of control circuitry, digital and/or analog, and may include a microprocessor, microcontroller, application-specific integrated circuit (ASIC), or other circuitry configured to perform various input/output, control, analysis, and other functions to be described herein. The controller 120 may be in communication with a memory 122 configured to store one or more routines as discussed herein. The memory may comprise a variety of volatile and non-volatile memory formats.

The controller 120 may be coupled to an user interface 124, which may comprise one or more switches, but may alternatively include other user input devices, such as a touchscreen interface, switches, knobs, dials, alpha or numeric input devices, etc. Additionally, the communication system 20 and/or the authentication system 30 may comprise various data devices including, but not limited to, the user interface 124, one or more sensors 50, a microphone 128, and various other sensors or inputs that may be implemented in the vehicle 12. Data received by each of the sensors or scanning apparatuses 14 may be processed by the controller 120 or the remote server 112 to identify or authenticate the operator and/or occupant 22 of the vehicle 12.

As discussed herein, the communication system 20 may be in communication with a variety of vehicle systems. For example, the communication system 20 is shown in communication with the vehicle control system 35 via a communication bus 130. Additionally, the controller 120 may be in communication with a plurality of vehicle systems via one or more input-output (I/O) circuits 132. For example, the communication system 20 may be in communication with a cabin control module 172 configured to adjust a seat position, comfort setting, and/or window setting corresponding to a control preference or setting of the occupant 22.

Still referring to FIG. 5, in some embodiments, the authentication system 30 may be in communication with one or more additional systems of the vehicle 12 via the I/O circuits 132. The I/O circuits 132 may be in communication with various devices or vehicle accessories. For example, the I/O circuits 132 may be in communication with a navigation system 134, one or more scanning apparatuses 14, and any other form of vehicle accessory or device incorporated in the vehicle 12. The controller 120 may receive location data from a GPS module incorporated in the navigation system 134. Though described as a navigation system, the system may correspond to a radio, infotainment system, HMI, or a variety of guidance or entertainment systems that may be implemented in the vehicle 12. Accordingly, the communication system 20 may be operable to update various settings to customize various presets, themes, and settings that may be associated with various vehicle accessories as discussed herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A communication system for a vehicle comprising:
a display device comprising a screen disposed in a passenger compartment, the display device in communication with a user interface;
an authentication system comprising at least one scanning apparatus configured to capture a biometric data;
a communication circuit configured to communicate with a remote server; and
a controller configured to:
capture the biometric data of a first potential passenger with the at least one scanning apparatus;
access a first passenger information comprising a first identification profile from the remote server via the communication circuit;
authenticate the first potential passenger as at least one of a confirmed passenger and an operator of the vehicle based on the identification profile and the biometric data;
display image data on the screen; and
display for-hire vehicle information over the image data.

2. The system according to claim 1, wherein the controller is further configured to:
communicate a confirmation of an identity of the confirmed passenger or the operator of the vehicle to the remote server.

3. The system according to claim 1, wherein the controller is further configured to:
receive an input via the user interface indicating an acceptance of the first potential passenger as the confirmed passenger for transportation.

4. The system according to claim 1, wherein the first identification profile identifies the first potential passenger as the operator of the vehicle; and in response to the authentication of the operator, the controller outputs a control signal activating the vehicle for operation by the operator.

5. The system according to claim 1, wherein the at least one scanning apparatus comprises a first scanning apparatus comprising a first field of view directed to an operator position in the passenger compartment.

6. The system according to claim 5, wherein the at least one scanning apparatus comprises a second scanning apparatus comprising a second field of view directed to a passenger position in the passenger compartment.

7. The system according to claim 6, wherein the controller is further configured to:
capture the biometric data of a second potential passenger with the at least one scanning apparatus; and
access a second passenger information comprising a second identification profile from the remote server via the communication circuit.

8. The system according to claim 1, wherein the controller is further configured to:
distinguish between the operator and the confirmed passenger based on the first identification profile and second identification profile.

9. The system according to claim 1, further comprising:
at least one imager in communication with the display device and configured to capture the image data depicting a rearward-directed field of view relative to a forward direction of the vehicle.

10. A method for operating a passenger transit system comprising:
receiving a request for transportation from a user;
determining an identification of the user associated with the passenger request;

capturing biometric data of a potential passenger with a scanning apparatus;
accessing passenger information comprising an identification profile from a remote server via a communication circuit;
identifying the potential passenger as at least one of a confirmed passenger and an operator of a vehicle based on the identification profile and the biometric data;
authenticating the potential passenger as at least one of the confirmed passenger and the operator of the vehicle based on the identification profile and the biometric data;
displaying image data as captured by at least one imaging device; and
displaying occupant information, wherein the occupant information coincides with the image data.

11. The method according to claim 10, further comprising:
identifying the potential passenger as the operator of the vehicle; and in response to the authentication of the operator, a controller outputs a control signal activating the vehicle for operation by the operator.

12. The method according to claim 10, further comprising:
identifying that the identification of the user matches the identification profile based on the biometric data.

13. The method according to claim 10, further comprising:
in response to identifying that the identification of the user matches the identification profile, determining that the potential passenger is the confirmed passenger.

14. The method according to claim 10, further comprising:
receiving a confirmation via a user interface accepting the potential passenger as the confirmed passenger for transportation.

15. A communication system for a vehicle comprising:
a display device comprising a screen disposed in a passenger compartment;
a user interface in communication with the display device;
at least one imager configured to capture image data depicting a rearward-directed field of view relative to a forward direction of the vehicle;
a communication circuit configured to communicate with a remote server; and
a controller configured to:
    access a first passenger information from the remote server via the communication circuit;
    display the first passenger information on the screen;
    receive an input via the user interface indicating an acceptance of a first potential passenger as a confirmed passenger for transportation;
    communicate the acceptance to the remote server;
    display the image data on the screen; and
    display navigation instructions to a pickup location for the confirmed passenger superimposed over the image data on the screen.

16. The communication system according to claim 15, further comprising:
an authentication system comprising at least one scanning apparatus configured to capture a biometric data, wherein the controller is further configured to:
    capture the biometric data with the scanning apparatus;
    authenticate at least one of the confirmed passenger and an operator of the vehicle based on an identification profile; and
    communicate a confirmation of an identity of the confirmed passenger or the operator of the vehicle to the remote server.

17. The communication system according to claim 15, wherein the controller is further configured to:
receive an input via the user interface indicating a refusal of the first potential passenger as a confirmed passenger for transportation;
communicate the indication of the refusal to the remote server;
receive second passenger information regarding a second potential passenger for pickup from the remote server; and
display the second passenger information on the screen.

18. The system according to claim 1, wherein the for-hire vehicle information includes transportation information and information relating to the operation of the vehicle.

19. The method according to claim 10, wherein the occupant information includes potential occupant information and pickup information.

20. The method according to claim 10, further comprising:
capturing the biometric data of the potential passenger with a mobile device comprising an integrated scanning apparatus;
accessing the biometric data captured by the mobile device from the remote server via the communication circuit; and
displaying information corresponding to the mobile device, wherein the information corresponding to the mobile device coincides with the image data.

* * * * *